Oct. 13, 1942.  E. A. DAVIS  2,298,685
APPARATUS FOR DEBEADING TIRES
Filed July 5, 1941  2 Sheets-Sheet 2

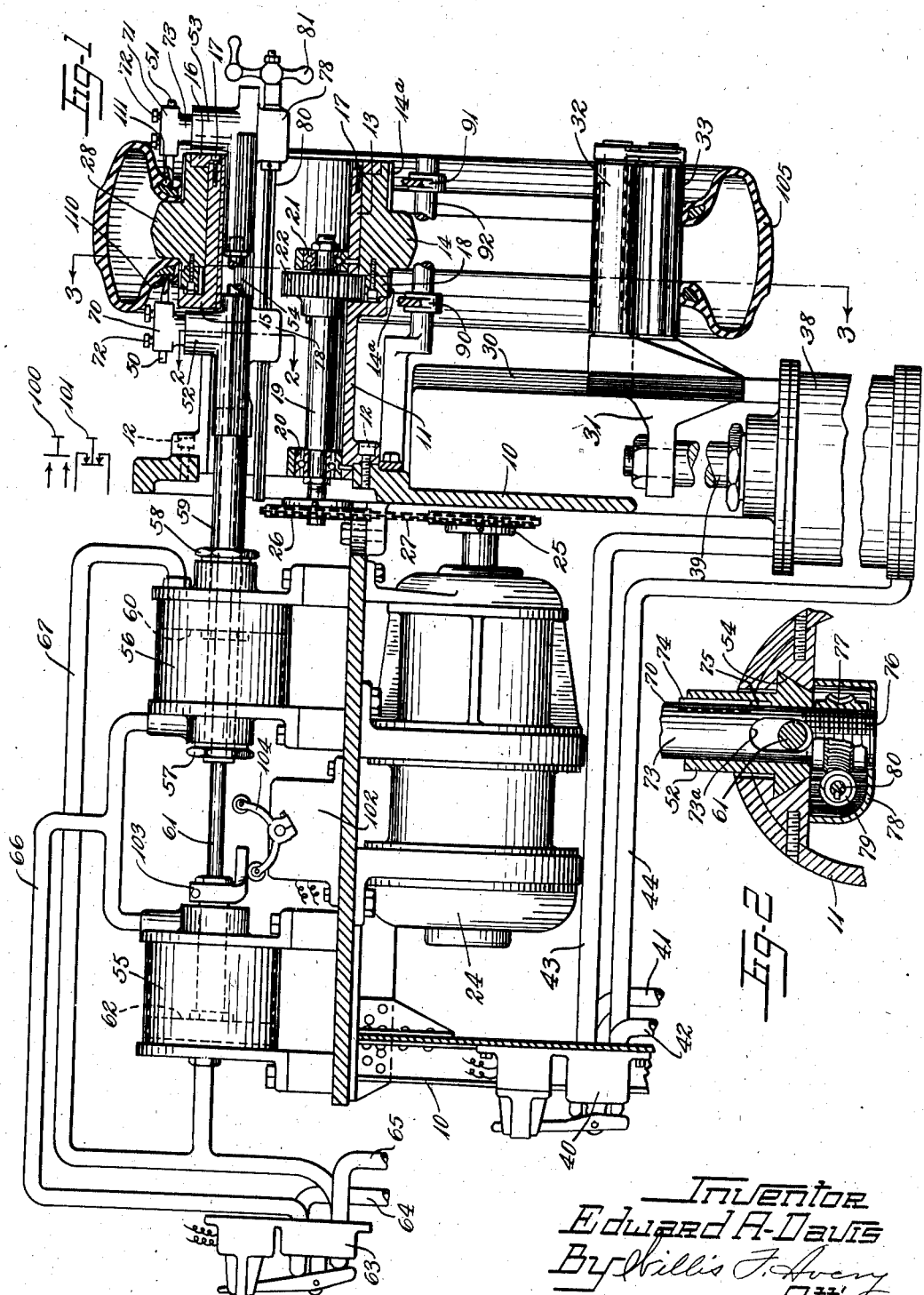

Inventor
Edward A. Davis
By Willis F. Avery
Atty

Patented Oct. 13, 1942

2,298,685

UNITED STATES PATENT OFFICE 2,298,685

APPARATUS FOR DEBEADING TIRES

Edward A. Davis, Akron, Ohio, assignor to The B. F. Goodrich Company, New York, N. Y., a corporation of New York Application July 5, 1941, Serial No. 401,093

4 Claims. (Cl. 164—39)

This invention relates to apparatus for debeading the outer casings of pneumatic tires and is useful for circumferentially severing the rubber and fabric material overlying the metal bead-reinforcing rings.

In the art of reclaiming used pneumatic tire casings, it is desirable to separate the metal bead-reinforcing rings from the rubber and textile material in which they are embedded. While formerly it has been the practice to sever circumferentially the bead portions containing the metal reinforcements from the remainder of the casing, such a practice has resulted in waste of a considerable amount of rubber and fabric material which has been discarded with the metallic reinforcements.

In the Lequillon Patent No. 2,230,302 apparatus is provided for slitting the casing circumferentially through the material overlying the metallic bead-reinforcing rings and then pulling the metallic rings through such slits to remove the rings cleanly from the tire. In the form of apparatus illustrated in such patent, however, the tire casing was driven by the engagement with the tread during the cutting operation, which expedient, while effective for most not too greatly worn, has not been fully satisfactory for tires which were so damaged as to leave large holes in the tread or to weaken the sidewalls so that the tire flattened easily and interfered with operation of the cutting tools, and a further difficulty in providing sufficient traction was encountered requiring the cutters to be fed slowly.

The present invention aims to overcome this difficulty by providing for rigid support of the casing at the cutting position and for positive driving of the casing without the use of cores for support.

The principal objects of the invention are to provide rigid support of the bead portions of the tire at a cutting station, to provide for positively feeding the casing to slitting mechanism, to provide for the handling of tires of a variety of dimensions, and to provide semi-automatic control of the apparatus.

These and other objects will appear from the following description and the accompanying drawings.

Of the drawings:

Fig. 1 is a side elevation, partly in section, of an apparatus illustrating and embodying the invention in one of its embodiments, parts being broken away.

Fig. 2 is a detail sectional view thereof taken on line 2—2 of Fig. 1, parts being broken away.

Figure 3:
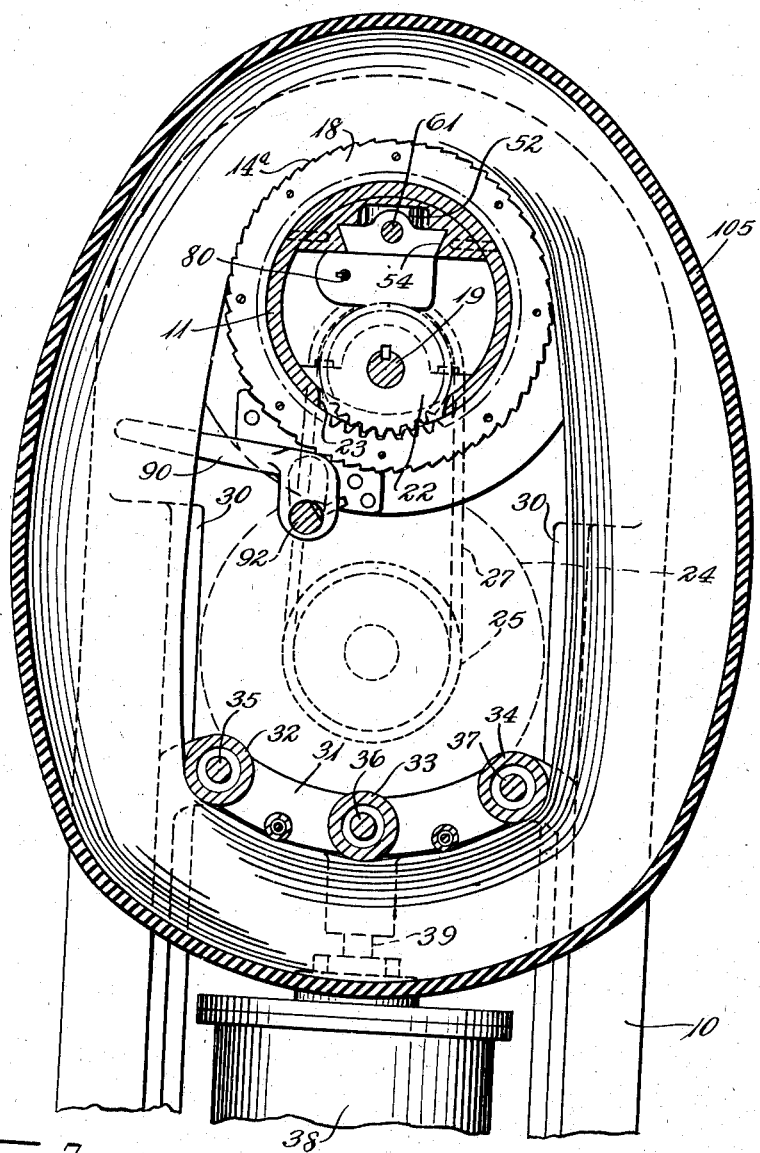
Fig. 3 is a detail sectional view of the apparatus taken on line 3—3 of Fig. 1, parts being broken away.

In accordance with the invention, a pneumatic tire casing is tensioned about guiding and driving members which contact with the rim-engaging faces of the casing and its bead portions are rigidly supported from within the casing while the casing is driven as a belt to present its bead portions progressively at a station where slitting knives are fed through the material overlying the bead reinforcements. Provision is also made for automatic manipulation of the mechanism after the operator has placed a casing on the apparatus and has initially started the tensioning of the casing.

Referring to the drawings, the numeral 10 designates the stationary frame of the apparatus on which a horizontally projecting tubular arm 11 is secured by bolts 12. Arm 11 is formed with a bearing surface 13 at its outer extremity about which an annular driving member 14 is rotatably mounted. The driving member is retained against end-movement by a fixed flange 15 of the arm and a removable flange 16 secured to the arm by bolts 17. An internally toothed ring gear 18 is fixed to the member 14 with its teeth clearing the bearing surface.

For driving the member 14, a shaft 19 extends axially of the arm 11 and is rotatably supported therefrom by bearings 20, 21 mounted within the arm. A pinion 22 is fixed to one end of the shaft 19 and engages the ring gear 18 through a clearance opening 23 formed in the wall of the arm. An electric motor 24 is mounted on frame 10 and a sprocket 25 fixed to the motor shaft, drives a sprocket 26, fixed to shaft 19, by means of a chain 27. For driving the tire casing positively the rotatable driving member 14 is formed on its periphery with a medial outwardly-directed flange 28 and the peripheral surface at each side thereof including the outer periphery of the ring 18 is formed with driving teeth 14$^a$. These teeth are preferably of saw-tooth cross-section having substantially radial driving faces and inclined back-faces, the radial faces facing in the direction of travel so as to be useful in propelling the tire.

For tensioning the tire a vertical guideway 30 is formed on the frame 10 and a cross-head 31 is slidably fitted therein for movement toward and from the arm 11. A plurality of hollow rollers 32, 33, 34 are rotatably mounted on the cross head 31 about stub-shafts 35, 36, 37 fixed thereto.

A double-acting fluid pressure operated cylinder 38 is fixed to the frame 10. Its piston-rod 39 is fixed to cross-head. The arrangement is such that with the cross-head 31 in raised position, the smallest sized tire casing will pass over the driving member 14 and the guide rollers 32, 33, 34 and by lowering the cross-head any size tire, within the range of the apparatus, may be tensioned about the driving member and the guide-rollers.

For operating the cross-head 31 a 4-way Ross solenoid-operated valve 40 is mounted on frame 10 and is connected to a supply line 41, an exhaust line 42 and by lines 43, 44 with the top and bottom ends respectively of the cylinder 38. The valve arrangement is such that when the solenoid thereof is energized, fluid is admitted to pipe 43 and pipe 44 is connected to exhaust lowering the cross-head 31 and tensioning the tire, and when the solenoid is not energized, the valve reverses under spring pressure and admits fluid pressure to pipe 44 and opens pipe 43 to exhaust raising the cross-head.

For progressively slitting the material overlying the bead reinforcements a pair of knives 50, 51 are mounted respectively on a pair of cross-heads 52, 53, slideably mounted in a guideway 54, formed in the arm 11. A pair of double-acting fluid-pressure operated cylinders 55, 56 are fixed in line to the frame 10. Cylinder 56 has stuffing boxes 57, 58 at its opposite ends and a hollow piston rod 59 extends through both stuffing-boxes at all positions and has a piston 60 fixed thereto. Cross-head 52 is also fixed to this piston rod. Cylinder 55 has a piston rod 61 fixed to its piston 62. This rod extends through the opening through piston rod 59 and cross-head 53 is fixed thereto. Fluid pressure supply to these cylinders is controlled by a 4-way solenoid-operated Ross valve 63, having a supply line 64 and an exhaust line 65. A pipe 66 connects one delivery port of the valve to the front end of cylinder 55 and the rear end of cylinder 56. Another delivery port of the valve is connected by a pipe 67 to the rear end of cylinder 55 and the front end of cylinder 67. When the solenoid of the valve is energized pipe 66 is connected to the pressure supply and pipe 67 to the exhaust and the knives are forced against the tire casing, and when the solenoid is deenergized the pipe 66 is connected to the exhaust and pipe 67 to the supply causing the knives to be retracted.

For adjusting the position of the knives radially of the tire casing, each of the cross-heads 52, 53 is provided with a tool-holder 70, 71 having a cross passage for receiving a knife, and clamp screws 72 for retaining it.

Each tool-holder has a shank 73 of round cross-section (see Fig. 2) slideably fitted in the cross-head for vertical movement and prevented from rotation by a key 74 engaging a keyway 75 in the cross head. The lower end of the shank is threaded, as at 76, and a worm gear 77 has a threaded bore adapted to engage the threads. The worm gear is retained against end movement by a retainer 78. Each worm wheel engages a worm 79 slideably mounted on a splined shaft 80. The shaft 80 extends through both worms and has a handle 81 fixed thereto whereby it may be rotated to raise or lower the tool holders in unison. Due to the sliding engagement of the worms with the shaft 80, the adjusting mechanism does not interfere with the movement of the tools toward and from each other. As the shanks of the tool holders 70, 71 are in vertical alignment with the piston rod 61, the shank 73 is slotted vertically as at 73ª so that the rod 61 passes therethrough, the slot permitting the vertical adjustment. As the piston rod 61 does not extend to the shank of tool holder 71, the shank of this tool holder is not slotted.

For guiding the tire casing in its rotative movement, a pair of guide arms 90, 91 are adjustably mounted on a bar 92 fixed to the frame 10. They may be adjusted along the bar to a position where they contact the sides of the tire, and may be locked in place to guide the tire to the knives.

While the apparatus may be operated by manually and individually operated valves and switches to control the motor and cylinders, it is preferred to control these members by means of an electrically operated timing apparatus (not shown). A starting button 100 and a stopping button 101 are located on the machine frame at a position convenient to the operator. A limit switch 102 is fixed to the machine frame and a cam arm 103 is fixed to piston rod 61 in a position adapted to open and close the limit switch by contact with a rocker arm 104 fixed to the switch.

The arrangement is such that when the left arm of the rocker is depressed by the cam 103, as seen in Fig. 1, with the knives 50, 51 in their position closest to each other, the limit switch 102 is in open position and when the knives are far apart the cam arm 104 is rocked to depress its right arm, thereby closing the circuit through the limit switch. The limit switch 102 is in the circuits which control the timer and the motor 24 and the valves 63 and 40 and must be closed in order to permit starting the machine by means of button 100 and opened in order to permit stopping the machine by means of button 101.

In operating the apparatus, the tire 105 is hung on the rotatable head 14 and the starting button 100 is pressed. The limit switch 102 is closed at this time. The starting button energizes the solenoid of valve 40 causing cross-head 31 to be lowered to tension the tire. At the same time it starts the electric timer by closing a circuit including the timer. After a delay sufficient to permit tensioning of the tire, the timer closes a circuit which energizes the solenoid of valve 63 causing the knives 50, 51 to approach the walls of the tire and starting the motor 24. As the knives complete their movement toward each other cam arm 103 opens limit switch 102, resetting the circuit so that the stopping button 101 may be opened to stop the timer and with it the motor 24.

When the operator wishes to stop the machine when the cutting operation has been completed, he depresses the stopping button 101. The limit switch is in its open position at this time. This deenergizes the solenoid of the valve 63 returning the knives to positions away from the tire and stops the motor 24 and at the same time stops the timer and deenergizes valve 40 causing the cross-head 31 to be raised so that the tire can be removed. As the knives move out, cam arm 103 closes limit switch 102.

During the rotative movement of the casing the knives 50, 51 are forced progressively through the material surrounding the bead cores 110, 111 in a circumferential path while the bead portions of the tire are supported from within the tire by the rib 28 of the driving member. The tire is positively driven by and radially tensioned against the driving member so that positioning of the cut and the depth thereof is uniform and the tire is firmly supported. After the tire is removed from the machine, the bead cover may be removed from the circumferential slits without loss of rubber and fabric material. The knives may be adjusted toward and away from the driving member by manipulating the handle 81.

Variations may be made without departing from the scope of the invention as it is defined by the following claims.

I claim:

1. Apparatus for debeading a tire, said apparatus comprising a rotatable annular driving member having a medial outwardly-directed flange at its periphery adapted to enter between the beads of the tire, means for driving said member, and peripheral driving teeth at each side of said flange, said driving teeth being of saw-tooth form and each having a substantially radial driving face for propelling the tire and a sharp driving edge, a single tensioning carriage movable toward and away from the axis of the driving member for elongating the tire and drawing the bead portions of the tire radially against said driving teeth throughout a substantial arc of said driving member, an incising blade, and means for pressing said blade through the material of the bead of the tire to the core of the bead to incise the material thereabout circumferentially of the tire without removal of material.

2. Apparatus for debeading a tire, said apparatus comprising a rotatable annular driving member having a medial outwardly-directed flange at its periphery adapted to enter between the beads of the tire, means for driving said member, and peripheral driving teeth at each side of said flange, said driving teeth being of saw-tooth form and each having a substantially radial driving face for propelling the tire and a sharp driving edge, a single tensioning carriage movable toward and away from the axis of the driving member for elongating the tire and drawing the bead portions of the tire radially against said driving teeth throughout a substantial arc of said driving member, a pair of incising blades, and means for pressing each blade through the material of a bead of the tire to the core of the bead simultaneously to incise the material thereabout circumferentially of the tire without removal of material.

3. Apparatus for debeading a tire, said apparatus comprising a rotatable annular driving member having a medial outwardly-directed flange at its periphery adapted to enter between the beads of the tire, means for driving said member, and peripheral driving teeth at each side of said flange, said driving teeth being of saw-tooth form and each having a substantially radial driving face for propelling the tire and a sharp driving edge, a single tensioning carriage movable toward and away from the axis of the driving member for elongating the tire and drawing the bead portions of the tire radially against said driving teeth throughout a substantial arc of said driving member, an incising blade, and means for pressing said blade in a direction parallel to the axis of said driving member through the material of the bead of the tire to the core of the bead to incise the material thereabout circumferentially of the tire without removal of material.

4. Apparatus for debeading a tire, said apparatus comprising a rotatable annular driving member having a medial outwardly-directed flange at its periphery adapted to enter between the beads of the tire, means for driving said member, and peripheral driving teeth at each side of said flange, said driving teeth being of saw-tooth form and each having a substantially radial driving face for propelling the tire and a sharp driving edge, a single tensioning carriage movable toward and away from the axis of the driving member for elongating the tire and drawing the bead portions of the tire radially against said driving teeth throughout a substantial arc of said driving member, a pair of incising blades, and means for pressing each blade in a direction parallel to the axis of said driving member through the material of a bead of the tire to the core of the bead simultaneously to incise the material thereabout circumferentially of the tire without removal of material.

EDWARD A. DAVIS.